July 20, 1954      J. F. SHANNON      2,684,473
INDICATING AND RECORDING INSTRUMENT
Filed May 17, 1950      2 Sheets-Sheet 1
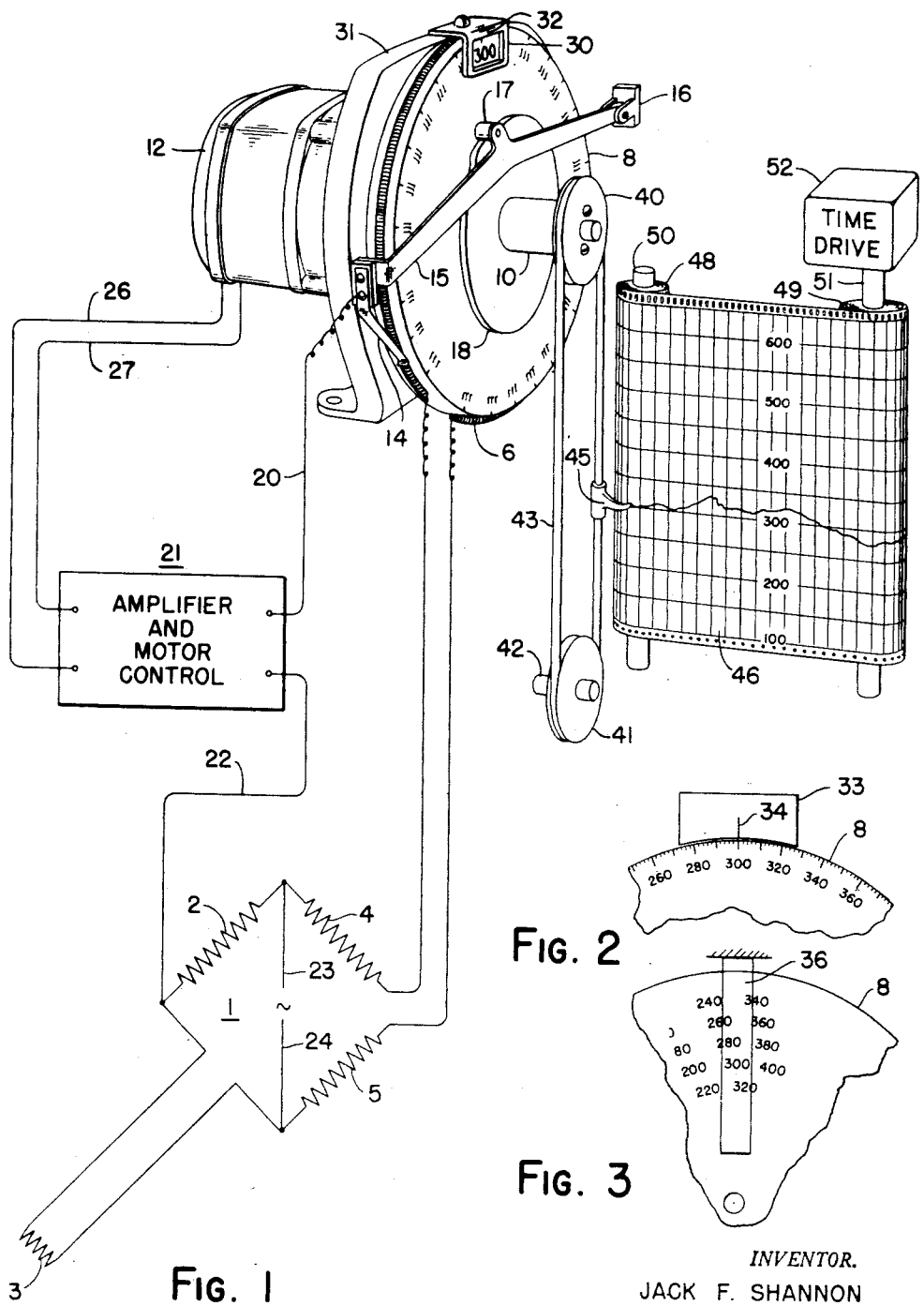
INVENTOR.
JACK F. SHANNON
BY
Raymond W. Jenkins
ATTORNEY

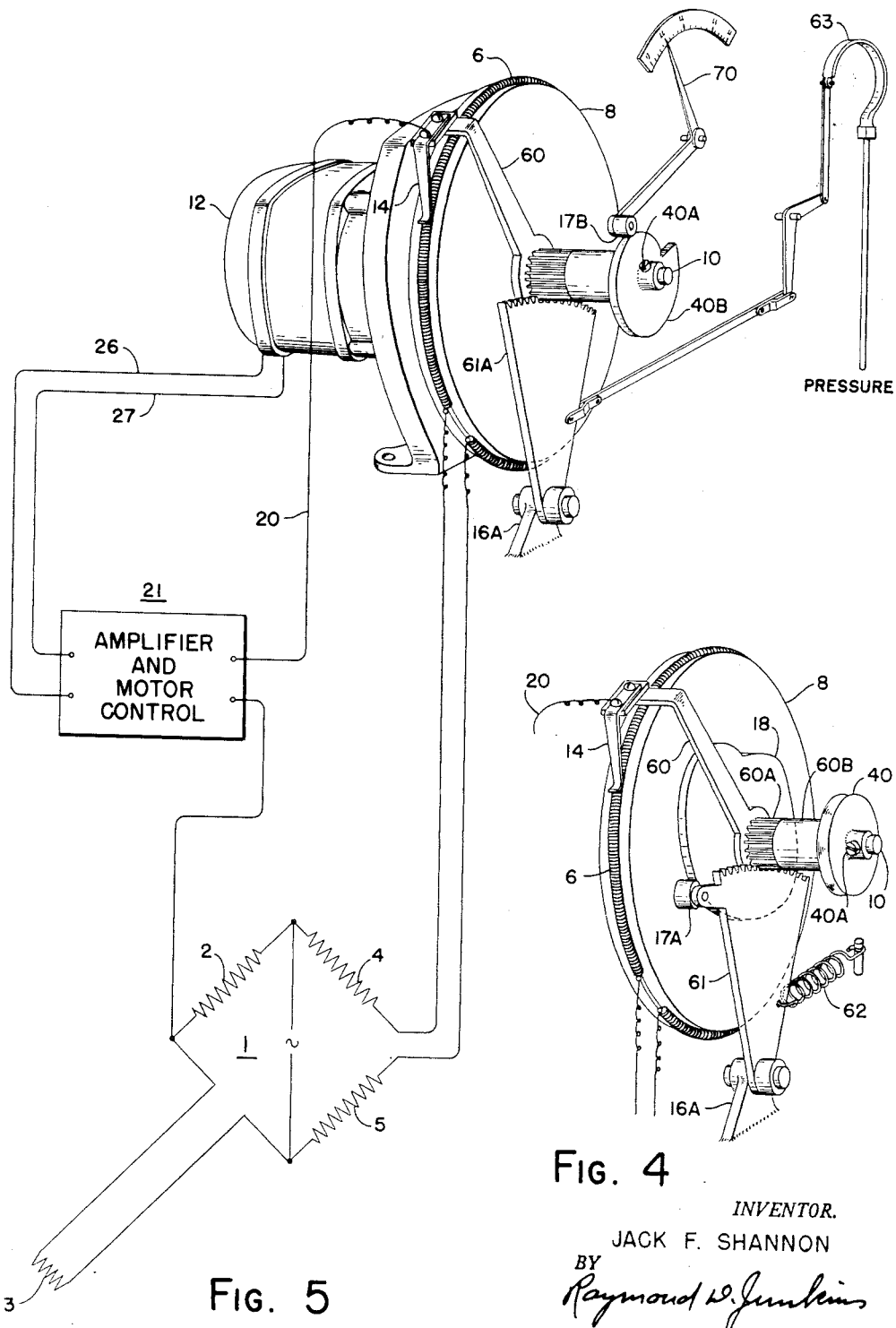

Patented July 20, 1954

2,684,473

UNITED STATES PATENT OFFICE 2,684,473

INDICATING AND RECORDING INSTRUMENT

Jack F. Shannon, Euclid, Ohio, assignor to Bailey Meter Company, a corporation of Delaware Application May 17, 1950, Serial No. 162,533

2 Claims. (Cl. 340—178)

This invention relates to indicating and recording instruments, and more particularly to drive control means for such instruments.

The measurement of variable conditions, such as temperatures, is frequently accomplished by instruments having balanceable networks which are adapted to be unbalanced by a variation in the condition and to effect, when the networks are unbalanced, an operation of a rebalancing means. An unbalance in response to the change in temperature may be obtained either by including in the network an element which varies in resistance with changes in the temperature, or by subjecting the network to an unbalancing potential from an element, such as a thermocouple, which is subjected to the temperature. The rebalancing means may include a motor which operates in response to the unbalance and positions a member which either adjusts resistance in the system or varies a voltage imposed on the system, until a balance is again obtained.

The resistance or voltage output of known elements may vary in a straight line relationship with changes in temperature up to certain values, but fail to follow such a relationship when these values are exceeded. Unbalances of the network at temperatures exceeding such values are, therefore, not directly proportional to the temperature changes, and the operation of the rebalancing means does not give a direct indication of temperature. If the adjustment of the resistance in the network or the variation of the voltage imposed thereon does not follow a straight line relationship with the operation of the rebalancing motor, then the motor will not operate uniformly for equal temperature changes and will not give a direct indication of temperature.

An object of my invention is to provide an improved control means for a recording or indicating instrument. Another object is to provide improved means for rebalancing a balanceable network adapted for use with a recording or indicating instrument. Still another object is to provide a balanceable network with an improved rebalancing means which is operative to give a direct indication of the condition affecting the balance of the network. Another object is to provide a balanceable network with an improved rebalancing means which is operative to cause a compensation of the condition affecting the balance of the network from a second variable or condition. Yet another object is to provide improved means for affecting operation of a rebalancing motor for a balanceable network, in direct proportion to changes in a condition which produces unbalance. Other objects will appear in the course of the following description.

A preferred form of my invention may include a slide-wire resistance connected into a bridge circuit and having a contact which is connected through a motor control circuit to a diagonally opposite point of the bridge for effecting operation of the motor when the circuit is unbalanced. The motor may be connected to the slidewire for moving it relative to the contact and dividing its resistance in the legs of the bridge so as to rebalance the network. In order that the motor may operate in direct proportion to the changes in the condition producing an unbalance of the bridge, means may be provided for moving the contact relative to the slide-wire so as to compensate for any inaccuracies in the bridge unbalancing means, for any lack of uniformity of the slide-wire, or for anything else in the system, other than temperature changes, that may affect operation of the motor. If desired, the motor could move the contact while the slide-wire was positioned by suitable compensating means. Instead of using a regular bridge circuit with the instrument, there may be used a circuit in which a voltage determined by the condition is directly opposed by a balancing voltage to control the operation of a motor. In such case, the balancing voltage may be regulated by the motor and by means which compensates for anything tending to effect operation of the motor in such a way that it does not give a direct indication of the condition.

This application forms a continuation-in-part of my copending application S. N. 731,573, filed February 28, 1947, now Patent 2,593,351, dated April 15, 1952.

There is shown in the accompanying drawing one form which my invention may assume in practice. In this drawing:

Fig. 1 is a schematic diagram of a bridge network having my improved balancing control means associated therewith so as to give a direct indication and record of a condition to be measured.

Figs. 2 and 3 show portions of different forms of indicating means.

Fig. 4 is an improved embodiment of my balancing control means for association with the bridge network and recording means of Fig. 1.

Fig. 5 is another embodiment of Fig. 4 for obtaining an indication of a condition from two factors.

Referring to Fig. 1, it will be noted that there is shown a bridge, generally designated 1, having a fixed resistance 2 forming one of its legs, a resistance element 3 forming an adjacent leg and varying in resistance in accordance with a temperature to be measured, and fixed resistances 4 and 5 cooperating with portions of a slide-wire resistance 6 to form the opposite pair of legs. The slide-wire 6 is mounted on the periphery of a circular plate 8 connected to a shaft 10 which is rotated through suitable gearing mechanism, not shown, by a motor 12. A flexible contact 14 slideably engages the wire 6 and is fixed to one end of an arm 15 which is pivotally attached at its other end to a stationary support 16. A roller 17 is carried by the arm 15 at a point between its ends and engages a cam 18 fixed to the shaft 10. The contact 14 is suitably insulated from the arm 15 and is connected by a conductor 20 to one terminal of an amplifier and motor control circuit 21. Another terminal of the control 21 is connected by a conductor 22 to a point on the bridge diagonally opposite from the contact 14. Other diagonally opposite points of the bridge are connected by conductors 23 and 24 to a source of alternating current. The amplifier and motor control 21 may be similar to that disclosed in the Hornfeck application Serial No. 693,290, filed August 27, 1946, now Patent No. 2,544,790, dated March 13, 1951. This circuit is adapted to supply current through conductors 26 and 27 to the motor 12 for effecting operation of the latter in one direction or another depending upon the unbalance of the bridge.

Inscribed upon the face of the plate 8 are figures which may be viewed through a window in a member 30 attached to a supporting frame 31 for the motor 12. The figure within the window and its position with respect to a reference mark 32 provides an indication of the temperature to which the resistance element 3 is subjected. Figs. 2 and 3 show other means adapted for use with the plate 8 to indicate the value of the condition measured. In Fig. 2, a block 33 is supported at the periphery of the plate and is provided with a reference mark 34 for indicating the point on the plate at which the reading is to be taken. This form of indicating means has no part projecting over the edge of the plate and possibly concealing the figures thereon, as in Fig. 1. Fig. 3 shows means supported at the edge of the plate and having an elongated window 36 through which the figures on the plate may be viewed. The point on the plate centered within the sides of the window indicates the figure to be read.

In order that a record may be obtained of the condition measured, there is provided, as shown in Fig. 1, a pulley 40 fixed to the shaft 10, a pulley 41 journaled on a shaft 42, and a belt 43 extending about the pulleys 40, 41 and carrying a pen 45 which is adapted to mark upon a chart 46. The chart is shown herein wrapped about rollers 48 and 49 fixed to shafts 50, 51, and suitable driving means 52 is adapted to drive the shaft 51 and roller 49 for moving the chart relative to the pen 45.

If, in the operation of the mechanism, the contact 14 was held stationary, an unbalance of the bridge would cause the motor 12 to operate and position the slide-wire 6 relative to its contact until the bridge was rebalanced. Any lack of uniformity in the resistance of the slide-wire, or a failure of the resistance element 3 to vary in resistance in a straight line relationship with temperature, would result in an operation of the motor through different degrees for equal changes in temperature, and an uneven distribution of figures on the plate 8 and the chart 46 would be required for indicating the true temperatures. A positioning of the contact 14 by the cam 18, while the motor positions the slide-wire 6, makes it possible, however, to correct for any inaccuracies in the system and to obtain a rotation of the plate 8 in direct proportion to the actual changes in temperature. The shape of the cam 18 may be determined by subjecting the element 3 to different known temperatures and positioning the contact 14 manually until the temperature indicated on the plate 8 and chart 46 correspond to the known temperatures. The path followed by the lower edge of the roller 17 during such measurements determines the shape of the cam. The arm 15 is moved through a comparatively small angle by the cam, and the flexibility of the contact 14 is sufficient to hold it in engagement with the slide-wire while the arm is moved to different positions.

Referring to Fig. 4, I show the same general arangement of motor-driven slide-wire 6 and indicating and/or recording mechanism found in Fig. 1 but with a different arrangement of balancing control means which permits a greater range of compensation. In Fig. 1 roller-carrying arm 15 can pivot at 16 only through a relatively narrow range of compensation as determined by cam 18 before contact 14 disengages, or otherwise becomes inoperative, with slide-wire 6.

In Fig. 4 I illustrate how, by rotating a contact arm 60 from the same center about which the slide-wire rotates, the contact 14 can be moved the entire length of slide-wire 6 in compensation. To control the rotation of arm 60 about shaft 10, gear 60A is provided for engagement with the teeth of sector member 61 which pivots about 16A. A spring 62 now urges the sector 61 in one direction of angular movement limited by integral roller 17A on the sector 61, engaging cam 18. The size of the sector, the number of engaging gear teeth and the shape of cam 18 then fix the angle through which arm 60 rotates contact 14 in compensation on slide-wire 6. The gear 60A is formed on a sleeve 60B which also carries the arm 60. The sleeve is journaled on the shaft 10 and, with arm 60, is confined between cam 18 and pulley 40, the latter being fastened to shaft 10 by a screw 40A. Thus the plate 8, cam 18 and shaft 10 move together, while arm 60, gear 60A and sleeve 60B are movable by the sector 61 about the same axis as shaft 10.

As a result of my invention, there is provided an improved mechanism for measuring the values of a variable condition. It will be appreciated that the motor 12 could as well be connected to position the contact 14 while the slide-wire was positioned by the cam or other suitable means. It will also be understood that my invention is applicable to the rebalancing of networks other than the Wheatstone bridge type shown herein.

Referring now to Fig. 5, I show the same general arrangement of motor-driven slidewire and indicating and/or recording mechanism found in Fig. 4 but with the slidewire contact 14 positioned directly by a second factor of the measured condition rather than a predetermination of the effect of the factor as expressed by the contour of cam 18 in Fig. 1 and Fig. 4. In connection with Fig. 1 the factor was described as slidewire irregularity, or non-linearity of variation in temperature element 3. The small amount of compensating movement practical with the arrangement of Fig. 1 restricted the proposed compensations to such mechanical concepts. However, with movement of the contact possible over the entire length of the slidewire, the amount of compensation is increased to embrace non-linear variations of condition factors, as a practical matter.

Sector 61A is positioned, not by cam 18, but by a pressure responsive device 63, representative of the non-linear factor for which the cam 18 heretofore compensated. The linkage between sector 61A and device 63 may contain a cam itself, the linkage may be so arranged, or device 63 may have the characteristic to give contact 14 the movement required for linearity of final indication. In Fig. 5 I have actually disclosed the linearity obtained by a cam 48B between the slidewire plate 8 and the indicating element 70. The choice of these means for obtaining linearity of final indication is arbitrary or dependent on factors characteristic to the particular application. Whatever the specific choice of arrangement, I have presented structure whereby, for example, with temperature sensed by bridge element 3 and pressure sensed by Bourdon tube element 63 the variations in density of a gas may be linearly exhibited.

While there is shown in this application one form which my invention may assume in practice, it will be understood that it may be modified and embodied in various other forms without departing from its spirit or the scope of the appended claims.

What I claim as new, and desire to secure by Letters Patent of the United States, is:

1. A measuring instrument including, in combination, a Wheatstone bridge having an element operating to effect an unbalance in response to a condition to be measured, a slidewire resistance adapted to be distributed in legs of said bridge for rebalancing the latter, a circular plate supporting said slidewire on its periphery and mounted for rotation, a contact engaging said slidewire, an arm pivoted on the circular plate center and having gear means and carrying the contact at the outer end, a motor, means electrically connecting the motor to the contact and to a diagonally opposite point on said bridge for effecting its operation on an unbalance of the bridge, means operatively connecting the motor to the plate for rotating the latter, a cam connected for rotation with said plate, a geared sector arm pivoted from a stationary base and engaging said gear means, means on said sector arm operatively engaging said cam, and means for exhibiting the plate position.

2. A measuring instrument including, in combination, a Wheatstone bridge having an element operating to effect an unbalance in response to a first condition to be measured, a slidewire resistance adapted to be distributed in legs of the bridge for rebalancing the latter, a circular plate supporting said slidewire on its periphery and mounted for rotation, a contact engaging the slidewire, an arm pivoted on the circular plate center and having gear means and carrying the contact at the outer end, a motor, means electrically connecting the motor to the contact and to a diagonally opposite point on the bridge for effecting its operation on unbalance of the bridge, means operatively connecting the motor to the plate for rotating the latter, a geared sector arm pivoted from a stationary base and engaging said gear means, a responsive device structurally arranged to be continuously responsive to a second condition algebraically cumulative with the first condition, a mechanical connection between the responsive device and the sector arm in such manner that the contact will be moved proportionately with the responsive device, and means for exhibiting the plate position as a function of the algebraic cumulation.

References Cited in the file of this patent

UNITED STATES PATENTS

| Number | Name | Date |
|---|---|---|
| 2,113,164 | Williams | Apr. 5, 1938 |
| 2,113,436 | Williams | Apr. 5, 1938 |
| 2,280,233 | Harrison | Apr. 21, 1942 |
| 2,332,288 | Zeitlin | Oct. 19, 1943 |
| 2,452,539 | Baecher | Nov. 2, 1948 |
| 2,485,730 | Giffen et al. | Oct. 29, 1949 |
| 2,577,483 | Roosdorp | Dec. 4, 1951 |

FOREIGN PATENTS

| Number | Country | Date |
|---|---|---|
| 394,025 | Great Britain | June 22, 1933 |